United States Patent
Jung et al.

(10) Patent No.: US 10,641,586 B2
(45) Date of Patent: May 5, 2020

(54) LASER SYSTEM WITH PROTECTION DEVICE

(71) Applicant: RHEINMETALL WAFFE MUNITION GMBH, Unterluess (DE)

(72) Inventors: Markus Jung, Eicklingen (DE);
Thomas Riesbeck, Celle (DE);
Thomas Baumgaertel, Celle (DE)

(73) Assignee: Rheinmetall Waffe Munition GmbH, Unterluess (DE)

(*) Notice: Subject to any disclaimer, the term of this patent is extended or adjusted under 35 U.S.C. 154(b) by 0 days.

(21) Appl. No.: 16/503,090

(22) Filed: Jul. 3, 2019

(65) Prior Publication Data
US 2019/0323803 A1    Oct. 24, 2019

Related U.S. Application Data

(63) Continuation of application No. PCT/EP2017/083433, filed on Dec. 19, 2017.

(30) Foreign Application Priority Data

Jan. 4, 2017 (DE) .................. 10 2017 100 068

(51) Int. Cl.
*F41H 13/00* (2006.01)
*G08B 13/183* (2006.01)
*H01S 3/067* (2006.01)

(52) U.S. Cl.
CPC ..... *F41H 13/0062* (2013.01); *F41H 13/0056* (2013.01); *G08B 13/183* (2013.01); *H01S 3/067* (2013.01)

(58) Field of Classification Search
CPC ............. F41H 13/0062; F41H 13/0056; G08B 13/183; H01S 3/067

USPC ......................................................... 340/557
See application file for complete search history.

(56) References Cited

U.S. PATENT DOCUMENTS

| 4,796,040 A | * | 1/1989 | Parra | G03B 17/06 348/E5.047 |
| 5,459,603 A | * | 10/1995 | Lebrun | F41G 1/35 359/230 |
| 5,837,918 A | * | 11/1998 | Sepp | F41H 13/0056 89/1.11 |

(Continued)

FOREIGN PATENT DOCUMENTS

| DE | 1497569 A1 | 7/1969 |
| DE | 69306078 T2 | 3/1997 |

(Continued)

OTHER PUBLICATIONS

International Search Report dated Mar. 13, 2018 in corresponding application PCT/EP2017/083433.

*Primary Examiner* — Omar Casillashernandez
(74) *Attorney, Agent, or Firm* — Muncy, Geissler, Olds & Lowe, P.C.

(57) ABSTRACT

A protection device for a laser system having at least one active laser and having at least one beam guide. Eye safety and/or protection for an exposed person is achieved using at least one additional laser as a warning laser which, operating in a visible spectral range, is used shortly before the active laser is used, and which, can cause at least one person to close his or her eyes and/or change his or her viewing direction away from the receptor point of the active laser beam on a target.

11 Claims, 3 Drawing Sheets

(56) References Cited

U.S. PATENT DOCUMENTS

| | | | |
|---|---|---|---|
| 6,028,723 A * | 2/2000 | Smith | B23K 26/16 |
| | | | 250/216 |
| 6,894,828 B2 | 5/2005 | Pelouch et al. | |
| 8,051,761 B1 | 11/2011 | Ullman et al. | |
| 9,335,131 B2 | 5/2016 | Devaux | |
| 2005/0279205 A1* | 12/2005 | Rode | F41H 13/0056 |
| | | | 89/1.11 |
| 2009/0040764 A1 | 2/2009 | Hugues et al. | |
| 2016/0062148 A1 | 3/2016 | Brudz | |

FOREIGN PATENT DOCUMENTS

| | | |
|---|---|---|
| DE | 60108174 T2 | 6/2005 |
| DE | 102012221164 A1 | 4/2014 |
| FR | 2753898 A | 4/1998 |
| FR | 2993971 A1 | 1/2014 |
| GB | 1147083 A | 4/1969 |
| WO | WO2007039473 A1 | 4/2007 |

* cited by examiner

LASER SYSTEM WITH PROTECTION DEVICE

This nonprovisional application is a continuation of International Application No. PCT/EP2017/083433, which was filed on Dec. 9, 2017, and which claims priority to German Patent Application No. 10 2017 100 068.2, which was filed in Germany on Jan. 4, 2017, and which are both herein incorporated by reference.

BACKGROUND OF THE INVENTION

Field of the Invention

The present invention relates to a protection device for a laser system for creating a laser system that protects the eyes. The laser system comprises at least one active laser with at least one beam guide in this case. The protection device is in particular provided for a laser weapon. The protection or eye safety of potentially endangered people is provided in this case by at least one additional safety device. Said safety device is intended to bring about or cause at least closing of the eye and/or possibly turning the viewing direction away from the receptor point of the active laser beam on a target. The safety device can comprise a further laser as a warning laser, which is used operating in a visible spectral range shortly before the use of the active laser.

Description of the Background Art

Laser effectors can be implemented as very precise weapons that can concentrate the action of a very small fleck, a so-called receptor point, on the target object. Furthermore, directional and diffuse reflections of the laser radiation can occur about the receptor point, depending on the laser power, the material and surface quality of the target object. Said laser radiation can also sometimes be damaging to the eyes.

The permissible laser power density according to international standards for the exposure to radiation (exposure limit value ELV) of the eye is 50 W/m² for an applied wavelength of 1.06 µm.

With some application scenarios discussed for laser weapons (attacking a pickup, speedboat, jet ski etc.) it cannot be excluded that the ELV value for the eye is exceeded in the case of soldiers, combatants and civilians located in the immediate vicinity of the receptor point and/or appearing in the direction of the reflections or scattering of the laser beam (active laser beam) from the receptor point. Looking into the direct beam/laser beam or at the receptor point from a short distance can lead to exceeding the ELV and thereby to damage.

DE 693 06 078 T2, which corresponds to U.S. Pat. No. 5,459,603, already concerns the topic of eye protection. This document describes an optical laser target device with alternating blocking of the laser and observation beam paths. A movable element blocks the laser beam when the target beam is not blocked by the movable element. During this the laser beam and the target beam are alternately blocked with such a frequency that the persistence of the retinal image of the operator is maintained.

DE 601 08 174 T2 (EP 1 391 014 B1), which corresponds to U.S. Pat. No. 6,894,828, proposes to allow a laser weapon to operate in the visually safe wavelength range.

DE 10 2012 221 164 A1 concerns a device and a method for detecting laser radiation. DE 14 97 569 A is cited therein, wherein it is displayed to the user of a periscope by means of a warning lamp that the periscope is directed towards a light source with eye-damaging radiation. The protection device can be used against laser radiation in optical instruments. However, because only directly incident laser radiation can be detected, DE 10 2012 221 164 A1 proposes to monitor incident light from a larger spatial angle for the presence of coherent, monochromatic or polarized laser radiation with a device and to output a warning signal.

Although said proposals appear practical, the use thereof for the present problem of eye protection while guaranteeing reliability is not practical, in particular as a laser weapon (or a weapon laser). The aforementioned eye-safe implemented lasers do not meet the requirements placed on a weapon laser or have significant disadvantages, compared for example to a Yb:YAG laser (weapon lasers), in terms of available laser power, achievable beam quality, illumination duration, stability, efficiency (electrical to optical), availability etc.

SUMMARY OF THE INVENTION

It is the object of the invention to exclude eye damage resulting from looking into the direct high intensity beam of an active laser, or at least to prevent the same.

In an exemplary embodiment, the invention is based on the idea of protecting a person against the eye-damaging light radiation of an active laser and warning said person. In addition to said warning, it is intended that eye safety is provided by either stimulating the eye closure reflex to close the eye and/or by changing the viewing direction of the person(s) from the receptor point and thereby from the scattered radiation or direct exposure to the radiation. It is provided to furnish a protection device against laser beams that are directly or indirectly incident on a target/object (for example diffuse scattered radiation).

The ELV value for the scattered radiation is shifted from a low limit value of the (open) eye to a high limit value of the skin (closed eye). For the closed eye the ELV value is 1000 W/m² (for human skin) and is thus greater by a factor of 20.

As a protective device, in addition to the active laser a laser is operated that works in a visible spectral range. Said laser is used shortly before the active laser is used. Said use is intended to result in closure of the eyes of the person(s) and/or turning the viewing direction away from the receptor point of the active laser beam.

Alternatively, by selecting the surface that is illuminated by the laser the view to the receptor point can be interrupted or the line of sight to the receptor point can be made unavailable. A laser operating in the green spectral range is preferable.

However, there is also the possibility of indicating the anticipated danger to the person or the people by transmitting a red laser beam. This can then be pulsed for example to signal to the people. Such pulsed red laser radiation can for example be used if primarily only tuning away is intended to be caused.

The laser is used in addition to the active laser and is used primarily for warning, which occurs with a time offset from the active laser. In this case, the warning laser can be a dazzling laser (dazzler), such as for example a GLOW (Green Laser Optical Warner). The active laser can be a fiber laser (approx. 1-100 kW/cm²). Other alternative lasers are known to the person skilled in the art.

The additional laser preferably illuminates at least the same surface on the target as the active laser. However, depending on the vignette (military: small system, application scenario) the surface illuminated by the additional laser on the object/target can also be much larger than the surface illuminated by the active laser, in order to allow the person or the people the line of sight to the receptor point. The at least one person in the effective range of the active laser notices said illumination. Intuitively, said illumination is perceived to be a danger. Because of the visibility of the laser beam of the additional laser, the at least one person will follow the human reflex, the so-called eyelid reflex, and/or will turn the viewing direction away from the beam direction of the additional laser (dazzling laser) or from reflections from the illuminated object/target.

Only after a predetermined time, as a rule after approx. 250 ms (eyelid reflex or time to turn away), is the actual active laser then switched onto the object/target.

Due to said forewarning by the additional laser or the time delay of the use of the active laser after the additional laser becomes effective, it is possible to avoid, or at least to minimize, damage to the people by the radiation of the active laser or the scattered radiation thereof from the receptor point. Damage can be considerably reduced as a result. In particular, in the case of successful eye closure, avoidance of (permanent) damage is achieved, because now the considerably higher ELV value for the skin (closed eyes) is responsible.

Owing to this solution, active lasers can be used in vignettes and the risk to people (such as soldiers, combatants, civilians etc.) can be considerably reduced.

The additional laser (dazzling laser) can be used both axially parallel in the optical axis of and offset from the active laser. The additional laser can additionally also be used as an illuminating laser for the active laser.

With the additional laser, graduation of the escalation is achieved, because the people are given prior visual warning.

It will be understood that the protection device according to the invention can also be used as an active laser in material processing etc., i.e. also in civil fields.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
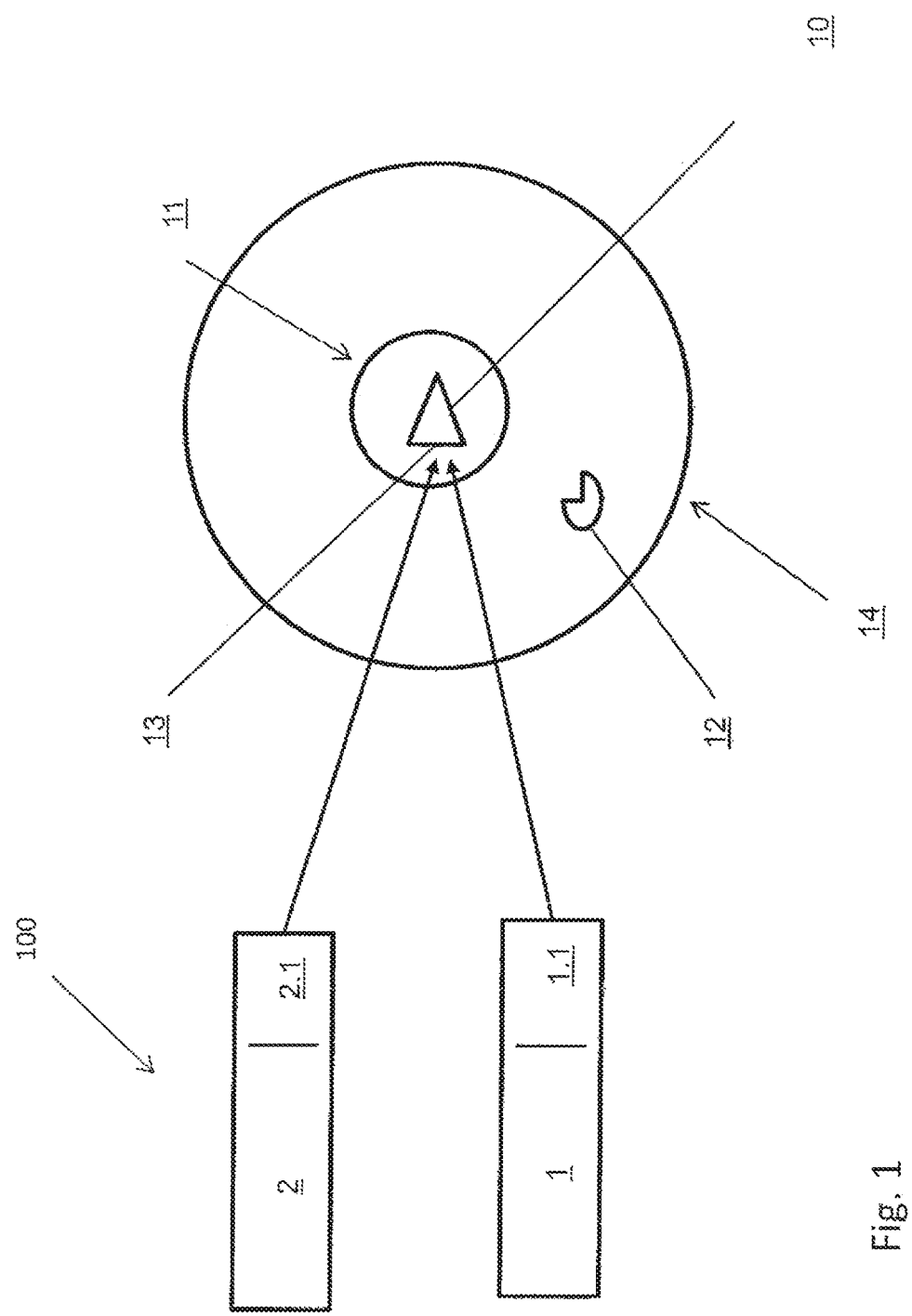
FIGS. 1-3 illustrate an exemplary embodiment in which a target is to be attached by at least one laser system.
Figure 2:
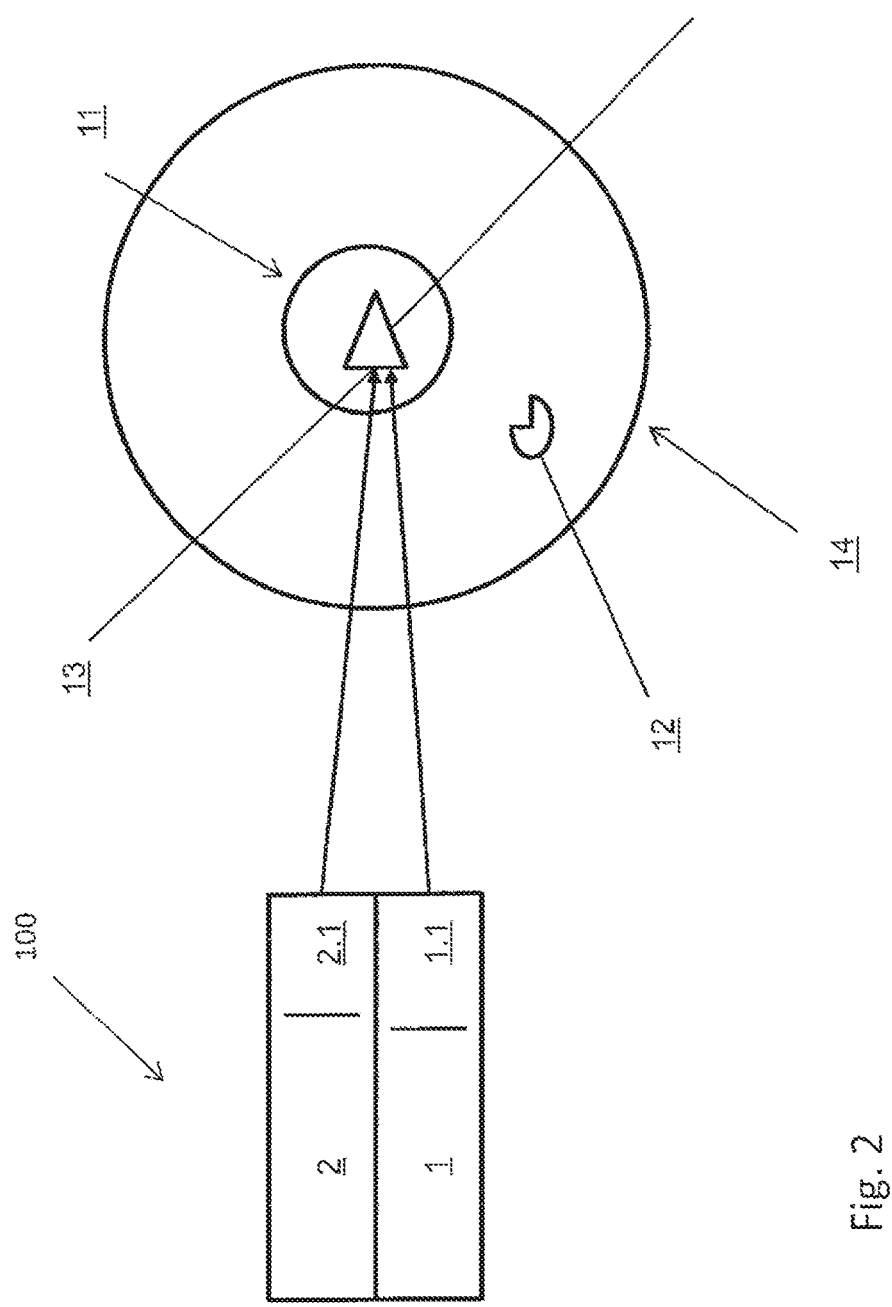
Figure 3:
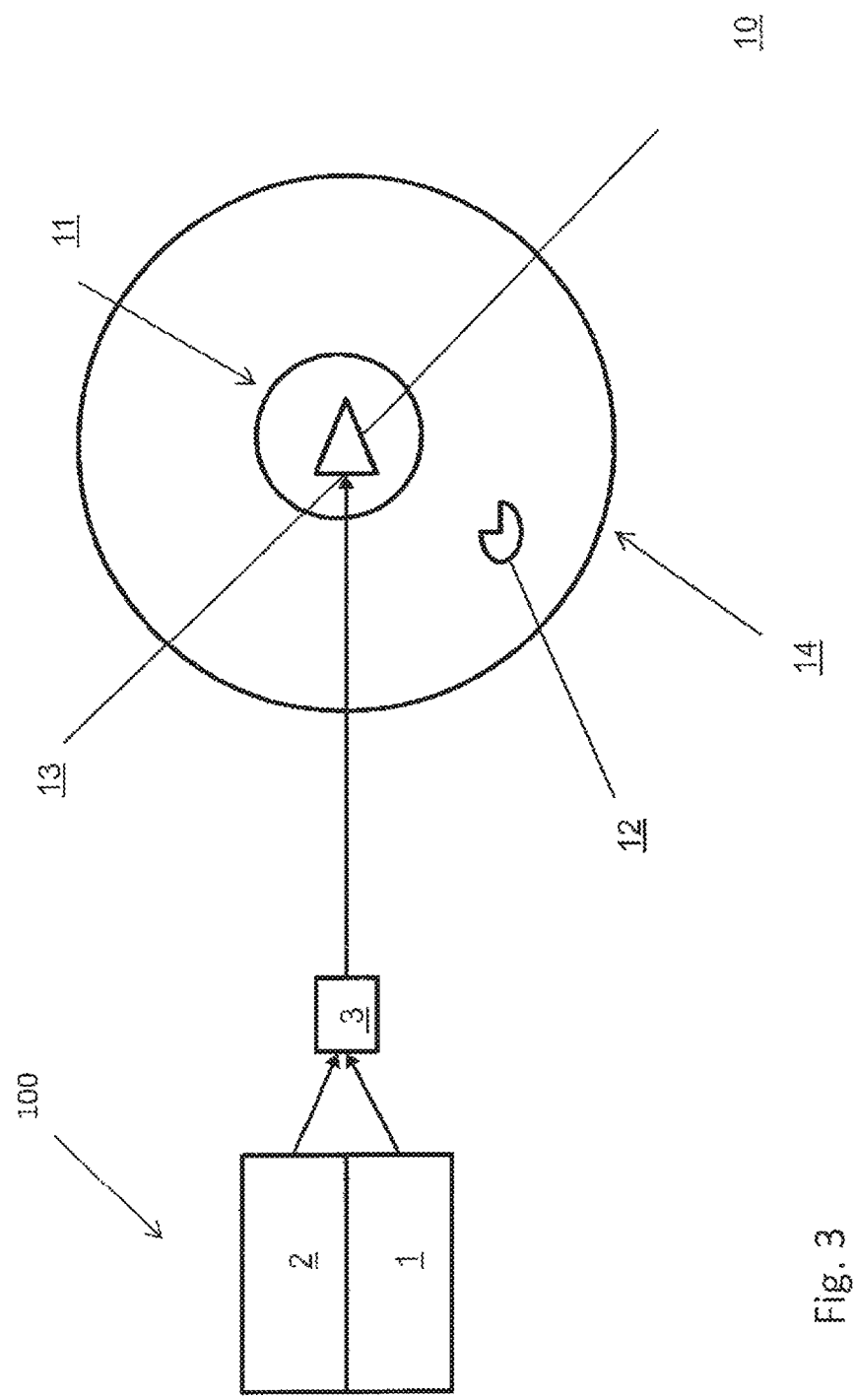

FIGS. 1 through 3 show in sketch form a target 10 that is to be attacked by at least one laser system, here by an active laser 1. A beam guide 1.1 is associated with the active laser 1. The active laser 1 is a laser weapon for attacking the target 10 in this exemplary embodiment.

14 denotes an effective range that exists around the target 10 when using the active laser 1. As can be seen from the figure, at least one endangered object 12, here at least one person 12, is in the effective range 14 of the active laser 1 or in the effective range 14 of the laser radiation thereof.

In order to avoid that eye injuries etc. could be caused to the person 12 by the laser radiation of the active laser 1, a protection device 100 is provided. Said protection device 100 has the task of signaling a hazardous situation to the person 12. In the preferred implementation, this signal is intended to have the result that the person 12 closes their eyes automatically (human reaction to brightness for example).

An additional laser 2 with a beam guide 2.1 is provided as a protection device 100 in the preferred implementation. said laser 2 is primarily operated as a warning laser.

According to FIG. 1, said additional laser 2 can operate offset from the active laser 1. The active laser 1 and the additional laser 2 are spaced apart from each other and from the target 10.

According to FIG. 2, the active laser 1 and the additional laser 2 are oriented axially parallel to each other. The two are preferably disposed in the immediate vicinity of each other.

In the exemplary embodiment according to FIG. 3, the active laser 1 and the warning laser 2 use the same beam guide 3. The actual beam guide 1.1 or 2.1 can be omitted, because the additional laser 2 and the active laser 1 are not operated at the same time but successively. A changeover to the beam guide 3 can be provided.

The active laser 1 can be a fiber laser (for example a Yb:YAG laser). The additional laser 2 can be a dazzling laser. Said dazzling laser can operate in the green spectral range. Whereas the active laser 1 preferably operates in the range from 1-100 $kW/cm^2$, the power of a dazzling laser is preferably 1-100 $mW/cm^2$.

The manner of operation is as follows:

The effective range 14 of the active laser 1, which can be different depending on the design of the active laser 1 if this is unknown, is intended to be determined in advance.

At least said effective range 14 of the active laser 1 is then monitored for people 12. The monitoring can be carried out visually or by means of sensors (not shown in detail). If at least one person 12 is detected within said effective range 14 of the active laser 1, visually or by means of the sensors, switching on the additional laser 2 is carried out before possible operation of the active laser 1. This switching on can be carried out manually. Automatic switch-on is possible, for example because of the sensor data processed in a control unit (not shown in detail).

By transmitting a visible light beam by the additional laser 2, the at least one person 12 is notified that he is in an endangered area. The visible light beam is transmitted as a warning signal in this case. The warning signal can be a green, red or another color of light beam.

With said information, the person 12 is warned about a hazard. As a result, it can be achieved that the at least one person 12 is prompted at least to close their eyes and/or to turn the viewing direction of the person(s) away from the receptor point 13 and thereby from the scattered radiation or direct exposure to the radiation of the subsequently switched on active laser 1.

Only after a predetermined time, i.e. after the switching on of the additional laser 2, as a rule after approx. 250 ms, is the actual active laser 1 then switched on to the object/target 10. This switch-on can preferably be initiated by the control unit.

The additional laser 2 can additionally or alternatively be used as an illuminating laser for the active laser 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A laser system comprising:
   an active laser with at least one beam guide and an effective range about an object/target when the active laser is in use;
   a protection device with at least one additional laser that operates in a visible spectral range,
   wherein the at least one additional laser is switched on if at least one person has been detected in the effective range of the active laser before the active laser is used.

2. The laser system as claimed in claim 1, wherein the active laser and the additional laser are mounted separately from each other.

3. The laser system as claimed in claim 1, wherein the active laser and the additional laser are oriented axially parallel to each other.

4. The laser system as claimed in claim 1, wherein the active laser and the additional laser access a common beam guide.

5. The laser system as claimed in claim 1, wherein the active laser is a fiber laser.

6. The laser system as claimed in claim 1, wherein the additional laser is a dazzling laser.

7. The laser system as claimed in claim 6, wherein the dazzling laser operates in a green spectral range.

8. The laser system as claimed in claim 1, wherein the protection device is adapted to function as an illuminating laser.

9. A method for the protection against laser radiation of a laser system with an active laser with at least one beam guide and an effective range about an object/target when an active laser is in use, the method comprising:
   determining the effective range about the object/target;
   monitoring at least the effective range for at least one person;
   transmitting a visible light beam by an additional laser after detecting the at least one person;
   switching the active laser onto the object/target.

10. The method as claimed in claim 9, wherein the switching on the active laser is carried out with a time offset relative to switching on the additional laser.

11. The method as claimed in claim 9, wherein the additional laser illuminates at least the same surface on the object/target as the active laser, wherein the surface on the object/target illuminated by the additional laser is adapted to be larger than the surface illuminated by the active laser.

* * * * *